April 26, 1966     A. S. MARTIN     3,247,691

SAFETY DEVICE

Filed Jan. 27, 1964

INVENTOR.
ARTHUR SEYMON MARTIN
BY
EDWARD D. O'BRIAN
ATTORNEY

United States Patent Office 3,247,691
Patented Apr. 26, 1966

3,247,691
SAFETY DEVICE
Arthur Seymon Martin, 2316 French St.,
Santa Ana, Calif.
Filed Jan. 27, 1964, Ser. No. 340,333
7 Claims. (Cl. 70—181)

This invention is directed to a safety device particularly of the character adapted to inhibit the unlocking operation of automobile door lock plungers.

It is virtually self evident that it is desirable to selectively render automobile door lock plungers accessible for operation and inaccessible for operation. This is particularly true in automotive vehicles having doors entering into both front and rear passenger spaces thereof. When children are transported in such automotive vehicles, they usually ride in the rear compartment so as not to cause the distraction of the driver's attention, and to give them more space for movement within the vehicle. However, when children are riding in the rear portion of the passenger compartment of such vehicles, the driver cannot watch their activity without neglecting his driving pursuits. Accordingly it is desirable to provide means in association with the common automobile door locking plungers to put them in such a condition that they cannot be unlocked by the rear compartment passengers, and yet may be readily unlocked and locked by persons properly equipped with the necessary knowledge and material.

Accordingly, it is an object of this invention to provide a safety device which renders the locking plungers in the doors of automotive vehicles selectively inaccessible for unlocking without tools, or accessible for ready locking and unlocking, at the choice of the operator of the vehicle.

It is another object of this invention to provide a safety device a combination lock plunger protector and operator which may be positioned so as to prevent actuation of the door plunger while in a locked position, and may be positioned to permit unlocking of the door plunger.

Other objects and advantages of this invention will become apparent upon a study of the following portion of the specification, the claims and the drawings in which:

As an aid to understanding this invention it can be stated in essentially summary form that it relates to a safety device of particular value with respect to automobile door locking plungers to selectively render them inaccessible and inoperative to those who are not equipped with appropriate knowledge and equipment for their operation. Such safety device comprises a suitable barrel inserted into the door frame to embrace the lock operating rod. Furthermore it comprises a plunger secured to the lock operating rod so that when the rod and lock are in the locked condition, the top of the plunger is substantially even with the top of the barrel. Furthermore a plunger guard and operator is positioned within the barrel and outside of the plunger. The plunger guard is of such configuration that it may be raised to raise the plunger and may be depressed to render the plunger inaccessible. In the depressed condition, the plunger guard can only be raised by means of insertion of a narrow instrument through a slot in the barrel to engage under an appropriate raising lip on the plunger guard. Raising the plunger guard to its full height causes raising of the plunger to condition the door lock to the unlocked status.

Figure 1:
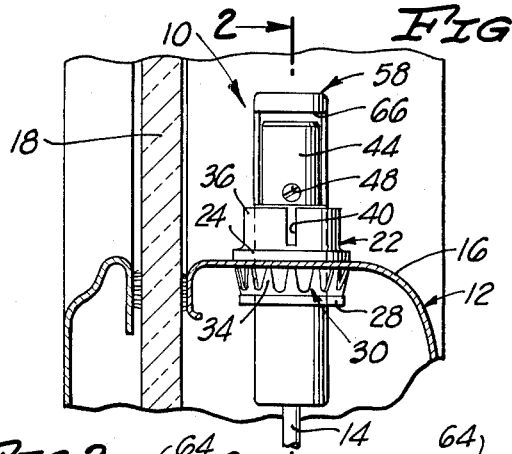
FIG. 1 is a side elevation of the preferred embodiment of the safety device of this invention showing the safety device in side elevation in association with a section of a portion of an automobile door.
Figure 5:
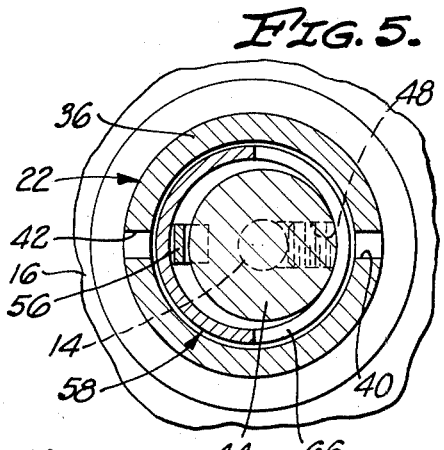
FIG. 5 is a section taken along the line 5—5 of FIG. 4.
Figure 2:
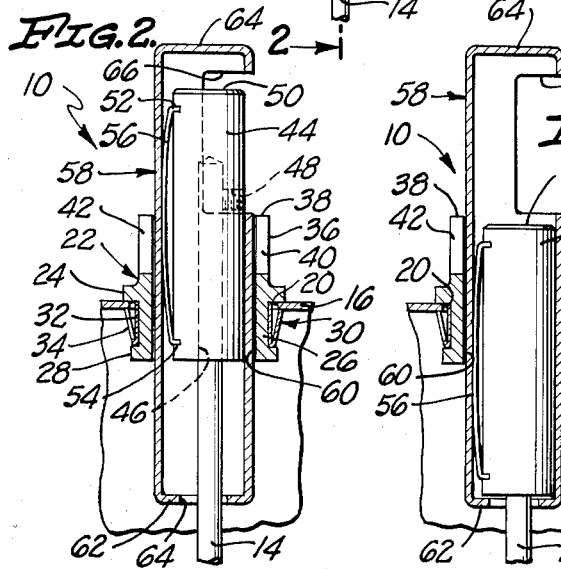
FIG. 2 is a section taken along the line 2—2 of FIG. 1.

This invention will be understood in greater detail upon reference to the following portion of the specification wherein the drawings are described. Referring now to FIG. 1, the preferred embodiment of the safety device of this invention is shown at 10. In order to fully understand the safety device 10, it is necessary to understand that automobile door 12 is equipped with normal locking mechanism which can be selectively conditioned so that neither the inside nor the outside handles on the door 12 are operative, for the opening of the door 12, and can be conditioned so that the inside handle of the door 12 is operative for the opening of the door. Such conditioning is controlled by lock operating rod 14 which, when moved upwardly as seen in FIG. 1, conditions the lock so that the inside handle is operative in opening the door 12, and when it is moved downwardly as seen in FIG. 1 the door lock is conditioned so that neither the inside nor the outside handles are operative to open door 12.

Door 12 is conventionally furnished with frame 16 adjacent window 18 in door 12. Frame 16 is provided with lock plunger hole 20 through which a lock plunger is conventionally positioned and is secured to the lock operating rod 14. In the safety device of this invention, the conventional lock operating plunger is removed from lock operating rod 14, and the safety device of this invention is installed.

In accordance with this invention barrel 22 is inserted through lock plunger hole 20. The barrel 22 carries flange 24 which engages on the upper surface of frame 16 around hole 20 to restrain the barrel 22 from downward movement. Barrel 22 has a cylindrical portion 26 which extends downwardly through hole 20 and terminates in retaining flange 28. Retaining flange 28 is larger in diameter than the cylindrical portion 26, but is sufficiently small to pass through hole 20. In order to maintain and retain the barrel 22 within frame 16, retaining spring 30 is positioned around the cylindrical portion 26 between flanges 24 and 28. Retaining spring 30 is made of a straight piece of spring material wrapped around the cylindrical portion 26 and has a flat back wall 32 which substantially forms a cylinder when the retaining spring 30 is wrapped around the cylindrical portion 26. Bent upwardly from the bottom portion of back wall 32 are a plurality of spring fingers 34 which engage beneath frame 16 adjacent lock plunger hole 20. Spring fingers 34 are of sufficient resiliency that the retaining spring 30 may be wrapped around the cylindrical portion 26 when barrel 22 is out of lock plunger hole 20, and when barrel 22 is inserted therein spring fingers 34 are deflected so as to permit them to pass through hole 20, and when the ends of the fingers pass below frame 16 the fingers spring outwardly to engage beneath frame 16. Since retaining spring 30 bears upon retaining flange 28, spring fingers 34 retain barrel 22 within hole 20. Retaining spring 30 is of such construction as to firmly maintain and retain barrel 22 in this position, but when it is desired that barrel 22 be removed spring 30 can be destroyed by prying upwardly on barrel 22. Thus barrel 22 may be placed in another hole 20 after new spring 30 is supplied therefor.

Barrel 22 has cylindrical portion 36 extending upwardly from flange 24 and terminating at top 38 at a suitable height, as is hereinafter described. The cylindrical portion 36 is visible to the occupants of the automobile and accordingly may be suitably decorated and/or finished. First and second slots 40 and 42 are cut on the diameter of cylindrical portion 36 to a level just above flange 24. Slots 40 and 42 are of sufficient width to accept the standard automobile ignition key, or other similar instrument.

Figure 3:
FIG. 3 is a section similar to the section of FIG. 2 showing the door locking plunger in the locked position and the plunger guard in the accessible position.
Figure 3:
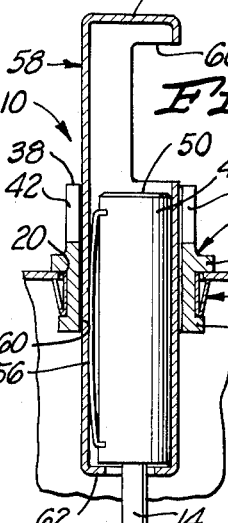

Lock operating plunger 44 is of cylindrical form and has a hole 46 into which lock operating rod 14 extends. Hole 46 is drilled along the axis of cylindrical lock operating plunger 44 to a sufficient distance to permit lock operating rod to enter a significant distance therein. Tapped set screw hole 48 is drilled radially into plunger 44 and intersects with hole 46. A set screw in tapped set screw hole 48 locks plunger 44 on operating rod 14. The proportions and dimensions are such that when the lock operating rod 14 conditions the lock to the unlocked situation, plunger 44 extends a significant distance above top surface 38 and hole 48 is just above surface 38 so that the set screw in hole 48 may be tightened against rod 14. The dimensions are also such that when rod 14 conditions the lock to the locked situation, the top surface 50 of plunger 44 is flush with, or slightly below the top surface 38 of barrel 22. This orientation is shown in FIG. 3. On the side opposite set screw hole 48, plunger 44 is provided with spring retaining slots 52 and 54. Flat spring 56 has a slight outward bow and has bent ends which associate with and enter into spring retaining slots 52 and 54. Thus, spring 56 is longitudinally restrained with respect to plunger 44.

Plunger guard 58 is of generally tubular construction of such radial dimension that it fits within the hole 60 in the barrel 22. Such is a sliding fit so that the plunger guard 58 may be relatively freely moved in its axial direction through barrel 22. The inside dimension of plunger 58 is such that plunger 44 may be contained therein in sufficiently close relationship that spring 56 bears within the inside of plunger guard 58 to frictionally retain plunger guard 58 with respect to operating plunger 44. The bottom of plunger guard 58 is closed by closure flange 62 which has hole 64 therein to permit free passage of lock operating rod 14. The top of plunger guard 58 is closed by closure cap 64 which completely covers the top surface 50 of operating plunger 44. The distance between closure flange 62 and closure cap 64 is such that the plunger guard 54 may be depressed downwardly to become substantially even with top surface 38 of barrel 22 when the lock operating plunger 44 and the guard plunger 58 are in the depressed condition as is shown in FIG. 4, and so that the plunger guard can extend substantially out of barrel 22 when the lock operating plunger is in the locked position, as is shown in FIG. 3.

Digital opening 66 is provided in one side of the plunger guard and extends in an axial direction from slightly below closure cap 64 to approximately the height of the top 38 of barrel 22 when plunger 44 is in the locked position and guard plunger 58 is in the raised position, and is shown in FIG. 3. In the circumferential direction, the digital opening 66 extends around plunger guard 58 slightly more than half way.

The safety device of FIGS. 1 through 4 is readily installed to control the lock on an automobile door by first removing the former, conventional plunger on the lock operating rod. Then barrel 22 is installed by positioning spring 30 around the cylindrical portion 26 and then pressing the barrel 22 into hole 20. Thereupon lock operating plunger 44, already positioned within guard plunger 58, is slipped over the top into operating rod 14 and is secured in the appropriate, previously described, position by tightening the screw in hole 48. The safety device of these figures is then ready for operation.

Figure 4:
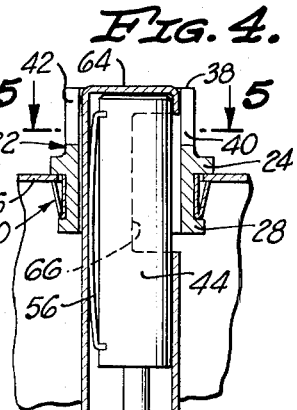
FIG. 4 is a section similar to the section of FIG. 2 showing the door lock operating plunger in the locked position and the plunger guard in the inaccessible position.

In operation, the lock of door 12 is readily conditioned to the locked situation by depressing plunger 44 to the position shown in FIGS. 3 and 4. When plunger guard 58 is left in the raised position of FIG. 3, it is apparent that the lock operating plunger 44 may be readily raised by the insertion of a finger in digital opening 66 so that raising of the guard plunger 58 raises the plunger 44. If such ease of operation is not desired, the guard plunger 58 can be depressed to the position shown in FIG. 4 where the guard plunger 58 is made relatively inaccessible so that those uninformed and unequipped, cannot raise guard plunger 58 to raise the lock operating plunger 44 to the position where the door lock is conditioned in the unlocked situation. Accordingly, the position of FIG. 4 permits peace of mind in the part of the driver with respect to concern for the rear seat passengers opening the door 12. In order to raise plunger 44 up from the condition of FIG. 4, to permit conditioning of the door lock so that the door 12 may be opened, it is simply necessary to insert an automobile key, or some other similar implement through one or the other of slots 40 or 42 to engage within digital opening 66 and raise plunger guard 58. When the plunger guard 58 is raised to the position in FIG. 3, a finger may be inserted in opening 66 so that it may be further raised together with raising of lock operating plunger 44 to unlock the door. If it is desired that the lock of door 12 be conditioned in the locked situation without depressing plunger guard 58, such can be accomplished by inserting a finger within opening 66 on the top surface 50 of operating plunger 44, in the condition shown in FIG. 2, and depressing the plunger 44 with the finger. Thus, the plunger guard 58 is not depressed.

Figure 6:
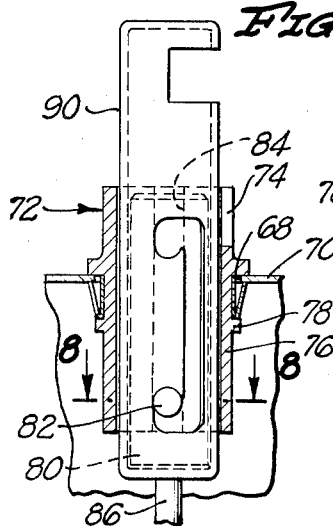
FIG. 6 is a side elevational view of another embodiment of the safety device of this invention showing the safety device in partial section and partially in side elevation.
Figure 7:
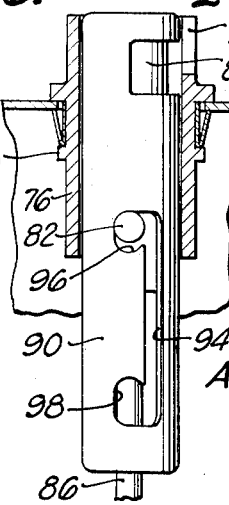
FIG. 7 is a view similar to FIG. 6 showing the door locking plunger in the locked position and the plunger guard in the inaccessible position.
Figure 8:
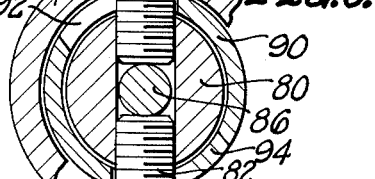
FIG. 8 is a section taken along the line of 8—8 of FIG. 6.

Another embodiment of this invention is shown in FIGS. 6 through 8 wherein hole 68 in door frame 70 accepts barrel 72 of structure similar to barrel 22. Barrel 72 differs in several regards. First it has only one slot 74 of appropriate dimension to accept an automobile key or other similar implement. Furthermore a substantially cylindrical portion 76 extends downwardly from retaining flange 78. The cylindrical portion extends downwardly a sufficient distance so that in the lowermost position of lock operating plunger 80, set screw 82 is still within the longitudinal bounds of cylindrical portion 76. Barrel 72 is provided with an axially extending guide slot 84 which extends from end to end of barrel 72. Set screw 82 locks operating plunger to lock operating rod 86 and extends slightly outside the radial confines of lock operating plunger 80 to a first distance. Set screw 88 also locks operating plunger 80 to lock operating rod 86 and extends past the radial confines of plunger 80 to a second distance. This second distance is such that set screw 88 engages within guide slot 84 to prevent rotation of lock operating plunger 80 with respect to barrel 72.

Plunger guard 90 is similar to plunger guard 58 in that it is axially slidable within the hole in barrel 72, and it slidably contains operating plunger 80. One side of plunger guard 92 is provided with a relatively large hole 92 through which set screw 88 extends. The other side of plunger guard 90 is provided with double offset slot 94 into which set screw 82 extends. Double offset slot 94 is provided with upper offset 96 and lower offset 98 of such configuration as to permit operating plunger 80 to be axially constrained with respect to plunger guard 90 by means of set screw 82 entering into one or the other of the offsets.

In installation, the old operating plunger is removed from lock operating rod 86, and barrel 72 is pressed into hole 68 and is retained therein by means of a spring similar to that previously described. Thereupon, operating plunger 80, already assembled into plunger guard 90, is fitted through the hole in barrel 72 and is secured to lock operating rod 86 in the appropriate position. In this assembled position the set screws 82 and 88 are directly above the upper surface of barrel 72. In the assembled position the set screws 82 and 88 are tightened.

In operation, the plunger 80 may be positioned in either the door locking position or the door unlocking position by manually moving the guard plunger upward or downward when the guard plunger 90 is in the condition as shown in FIG. 6. It can be seen that a simple insertion of a finger in the upper opening permits ready raising of operating plunger 80. If it is desired that the guard plunger 90 be arranged so that the lock operating plunger 80 cannot be easily raised, the guard plunger 90 is turned and depressed so that it is now oriented with set screw 82 in upper offset 96. In this condition, the plunger guard is not easily accessible, but can be raised by insertion of an automobile key, or like instrument, through slot 74 to engage within the upper opening in plunger guard 90.

This invention having been described in its preferred embodiment, and it having been shown how alternative embodiments are possible, it is easily seen that it is susceptible to changes and modifications within the ability of the routine engineer without the exercise of the inventive faculty. Accordingly it is desired that the scope of this invention be defined by the scope of the following claims.

I claim:
1. A safety device to be associated with and inhibit the operation of a lock, said safety device comprising:
 a barrel adapted to be positioned with respect to the lock, a plunger guard positionable within and reciprocable with respect to said barrel and a plunger adapted to be connected to condition the lock positioned within said plunger guard;
 said barrel having a top surface and a side, an opening in said side of said barrel extending to said top surface of said barrel;
 said plunger guard having a top surface and having sides, said plunger guard being positionable with respect to said barrel so that said top surface of said plunger guard lies in substantially the same plane as said top surface of said barrel, an opening in a side of said plunger guard, said opening in said side of said plunger guard being of suitable size for engagement by a digit so that when said opening in said plunger guard is accessible said plunger guard is adapted to be raised by digital engagement, said opening in said barrel being of insufficient size for digital access therethrough, said opening being so oriented so that when said top of said plunger guard is even with the top of said barrel said plunger guard can be raised only with an instrument smaller than a digit;
 and cooperating means between said plunger and plunger guard for causing raising of said plunger when said plunger guard is raised to an extreme position out of said barrel.

2. The safety device of claim 1 wherein said cooperating means comprises a closure flange on the bottom of said plunger guard engageable with said bottom of said plunger.

3. The safety device of claim 1 wherein said operating means includes a projection extending externally of said plunger engaging in a slot in said plunger guard.

4. A safety device adapted to be associated with and inhibit the operation of a lock, said safety device comprising a barrel having a top, said barrel being adapted to be positioned with respect to the lock, a plunger having a top, said plunger being selectively positionable within said barrel and being adapted to be connected to the lock to condition the lock so that when the top of said plunger is slightly below the top of said barrel the lock is conditioned to the locked condition, and means connected to said plunger in such a manner that said plunger may be raised by raising said means, said means being selectively positionable to a manually inaccessible position, but being capable of being engaged by an instrument extending into said barrel so as to move said means to a manually accessible position.

5. The safety device of claim 4 wherein said plunger has an axis of motion from its position where the door lock is conditioned to its locked condition and its position wherein the door lock is conditioned to its unlocked condition, and said means is selectively positionable with respect to said plunger by sliding motion with respect to said plunger generally along said axis.

6. A safety device adapted to be associated with and inhibit the operation of a lock, said safety device comprising a barrel adapted to be positioned with respect to the lock, said barrel having a top surface, a plunger guard positionable within and reciprocal with respect to said barrel, said plunger guard having a top surface, a plunger adapted to be connected to condition the lock positioned within said plunger guard, said plunger guard being positionable so that the top surface of said plunger guard and the top surface of said barrel lie substantially in the same plane and when said plunger guard is so positioned with respect to said barrel, said plunger is covered by said plunger guard and said plunger is inaccessible, said plunger guard being capable of being engaged by an instrument extending into said barrel so that said plunger guard is capable of being actuated to uncover said plunger so as to permit said plunger to be moved to a manually operable position.

7. A safety device adapted to inhibit the conditioning of an automobile door lock operating rod, said device comprising a plunger having a top and bottom secured to said lock operating rod, a barrel having a top adapted to be secured in the automobile door in a position around said plunger in which the top of said plunger is adjacent and slightly below the top of said barrel when said operating rod conditions said lock to its lock position, a plunger guard positioned within said barrel and containing said plunger, said plunger guard having a top and a bottom and being positionable so that the top of said plunger guard is adjacent to the top of said barrel, cooperating means between said plunger and said plunger guard for causing raising of said plunger when said plunger guard is raised to an extreme position out of said barrel in which the top of said plunger guard is positioned from the top of said barrel, said plunger guard having an opening adjacent its top which is sized for digital entry, said barrel having an opening adjacent its top which is sized for smaller than digital entry, said opening in said barrel being so positioned so that when the top of said plunger guard is adjacent the top of said barrel digital actuation of said plunger guard is inhibited, and so that an instrument may be inserted through said opening in said barrel into said opening in said plunger guard in order to raise said plunger guard.

References Cited by the Examiner

UNITED STATES PATENTS

| 2,244,976 | 6/1941 | Tinnerman | 85—80 |
|---|---|---|---|
| 2,708,845 | 5/1955 | Trammell | 70—181 |
| 2,735,289 | 2/1956 | Trammell | 70—181 |
| 2,834,628 | 5/1958 | Paparelli et al. | 292—347 |
| 2,874,988 | 2/1959 | Sage et al. | 292—347 |
| 2,950,614 | 8/1960 | Evans | 70—181 |

JOSEPH D. SEERS, *Primary Examiner.*

BOBBY R. GAY, *Examiner.*